No. 826,448. PATENTED JULY 17, 1906.
C. W. SPICER.
UNIVERSAL JOINT.
APPLICATION FILED OCT. 4, 1905.
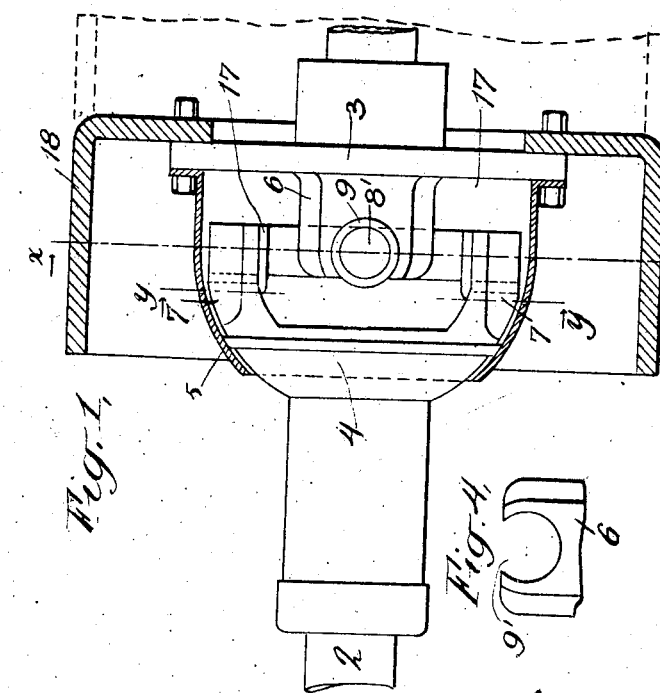
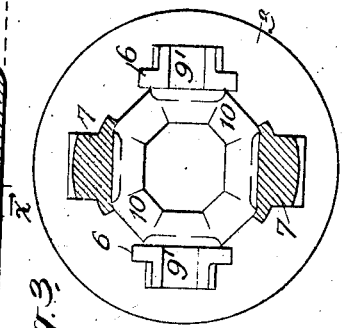
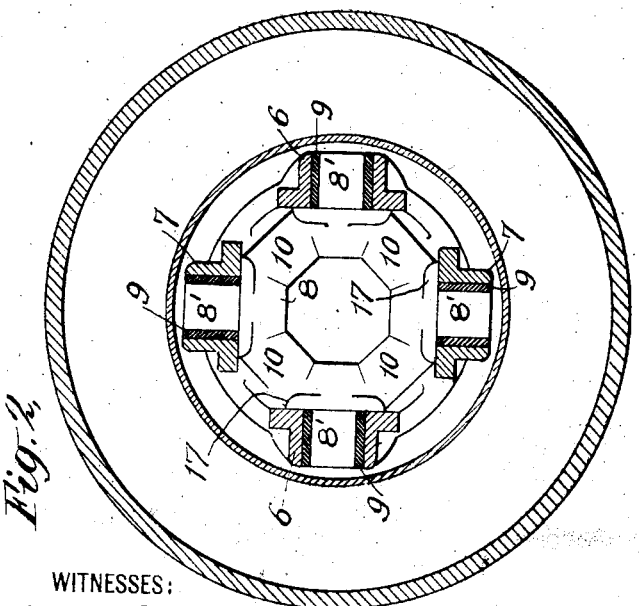
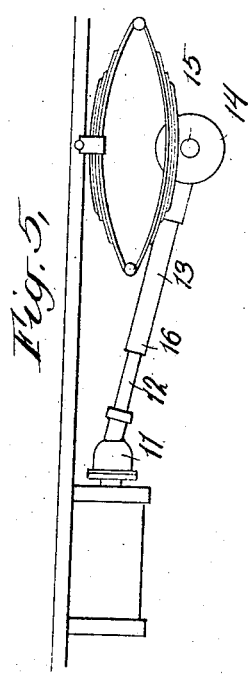
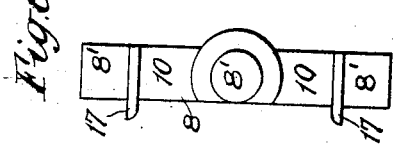
WITNESSES:
INVENTOR
C. W. Spicer
BY
H. M. Marble
ATTORNEY

UNITED STATES PATENT OFFICE.

CLARENCE W. SPICER, OF PLAINFIELD, NEW JERSEY.

UNIVERSAL JOINT.

No. 826,448.

Specification of Letters Patent.

Patented July 17, 1906.

Application filed October 4, 1905. Serial No. 281,253.

*To all whom it may concern:*

Be it known that I, CLARENCE W. SPICER, a citizen of the United States, residing at Plainfield, in the county of Union and State of New Jersey, have invented certain new and useful Improvements in Universal Joints; and I do hereby declare the following to be a full, clear, and exact description of the invention, such as will enable others skilled in the art to which it appertains to make and use the same.

My invention relates to improvements in universal joints, and comprises improvements in bearings of such joints, also an improved trunnion-block.

The objects of my invention are to increase the bearing-surfaces of the joint and to adapt the same for withstanding severe lateral stresses without increasing the dimensions of the joint, to avoid the transmission of power through fastenings, such as screws and the like, to improve the construction of the trunnion-blocks of such joints, and generally to increase the power-transmitting capacity of such joints, to reduce the friction, and to make such joints strong, simple, reliable, and relatively inexpensive.

I will now proceed to describe my invention with reference to the accompanying drawings, in which my invention is shown applied to a single universal joint of the type covered by my Patent No. 768,407, dated August 23, 1904; but it will be obvious that the invention is equally applicable to other universal joints as well as to double universal joints, such as that illustrated and described in my Letters Patent No. 806,592, dated December 5, 1905, for example.

In the said drawings, Figure 1 shows a central longitudinal section of the casing and a partial section and partial elevation of the joint mechanism of an incased universal joint constructed in accordance with my invention. Fig. 2 shows a central transverse section through the trunnion-bearings of the joint on the line *x x* of Fig. 1. Fig. 3 shows another transverse section on the line *y y* of Fig. 1, the view being on a smaller scale. Fig. 4 shows a detail side view of one of the horns, the corresponding bearing-bushing and trunnion-block journal being omitted; Fig. 5, a diagrammatic sectional elevation of a portion of the driving mechanism of a motor-vehicle. Fig. 6 shows a detail side view of the trunnion-block.

In the said drawings numerals 1 and 2 designate two shafts or rotary members, of which either may be the driving member and the other the driven member, said members being connected by the herein-described universal joint. Said joint comprises two members 3 and 4, of which one, as 3, is commonly formed as a disk and the other, 4, is a hub of shaft 2, spherically curved on its rear side for engagement with the casing 5, secured to disk 3, as described in my said Patent No. 768,407. The two joint members 3 and 4 have projecting bearing-horns 6 6 and 7 7 on their adjacent sides, and between said members 3 and 4 is a trunnion-block 8, having trunnion-pins or journal-pins 8' 8' having bearings in bushings 9 9, fitted within suitable recesses of the bearing-horns 6 and 7.

To facilitate assembling the parts of the universal joint and to facilitate the use of a one-piece trunnion-block, the bearing-horns 6 and 7 are provided with openings 9' at their ends large enough to permit the passage sidewise of the journal-pins 8', but too narrow to permit the passage of the bushings 9, which latter are arranged to be introduced endwise. In assembling the joint the horns of the members 3 and 4 are slipped over the appropriate journal-pins of the trunnion-block, and then the bearing-bushings 9 are introduced lengthwise into the sockets of the bearing-horns, said bushings slipping over the journal-pins. These bushings commonly have a drive fit in their sockets, and so do not work out, though they may be removed readily. When in place, they hold the parts of the joint together firmly. This feature of the construction of my universal joint is fully described and is claimed in my aforesaid patent, No. 806,592, and is described herein only so far as is necessary to permit understanding of the construction shown.

One feature of my invention resides in the one-piece trunnion-block 8. The stresses which these trunnion-blocks are called upon to withstand are excessive and are often applied very suddenly, so that they are in the nature of shocks. Nevertheless lightness, compactness, and simplicity and cheapness are necessary. For these reasons I have devised the form of trunnion-block shown, which is so designed that it may be made in one piece, as a drop-forging, and thus may be formed of high-grade metal, and may be exceedingly strong, tough, and free from joints at which looseness may develop in time. The four journal-pins of the trunnion-block are of course at the corners of a square with respect to each other, and these four journal-pins are connected by diagonal braces 10, springing from the journal-pins as nearly to the bearing-surfaces thereof as possible. Structurally the journal-pins are of course to be considered as cantalivers; but by the construction shown the length of these cantalivers is the minimum possible, and therefore the strength of the parts is maximum. The diagonal braces 10 form the only connection between the journal-pins, the center being open, since metal near the center is relatively inefficient for resisting the stresses to which the journal-pins are subjected. By the construction shown, therefore, I obtain maximum strength with minimum weight and with minimum space occupied.

It occasionally happens, particularly when the joints are used in the driving-gear of motor-vehicles, that said joints are called upon to withstand stresses much greater than the mere torsional stress due to the transmission of power. Fig. 5 illustrates a case in point. In this case the joint (designated by numeral 11) transmits power to an inclined propeller-shaft 12, which latter runs within a tubular housing 13, forming a continuation of the gear-case 14, within which are the usual bevel transmitting-gears commonly employed for transmitting motion from a propeller-shaft to the driving-axle 15, which gears are not shown in the drawings. The gear-case 14 is free to turn with respect to the frame of the vehicle, except for the bearing on the propeller-shaft, which it has at some point along its length, usually near its end, as at 18. Consequently the stresses on the universal joint 11 are not merely the torsional stresses of power transmission, but are also the stresses applied laterally, due to to the tendency of the gear-case 14 to rotate. To meet the excessive lateral pressure on the bearings thus produced, I provide bearing-shoulders 17 on the trunnion-block adjacent to the bases of the trunnion-pins, which shoulders are of such breath that they bear against the bearing-horns 6 6 and 7 7 directly, as shown, so that pressure transmitted from the driving or driven member of the joint to the trunnion-block, or, vice versa, is not transmitted through any part fastened in place by a screw, pin, or other fastening device which may work loose or give way, but is transmitted from an integral part of the driving or driven member to an integral part of the trunnion block, or vice versa. This is very important, as thereby all danger of accident due to possible insecurity of fastenings is avoided. It will be noted by examining Fig. 5 that the giving away of the universal joint while the vehicle is in motion and the consequent freeing of the propeller-shaft and its casing would be apt to result in the serious wrecking of the mechanism of the vehicle. By transmitting the load directly from integral parts of one member of the joint to integral parts of another member of the joint, avoiding transmission through fastenings of any kind, danger of breakdown of the joint is obviated. Obviously the bearing-surfaces of the shoulders 17 and of the parts of the driving and driven members with which these shoulders engage are not necessarily flat, and I do not limit myself to any particular type of bearing. It will also be obvious that my invention as described is independent of the casing with which the universal joint is shown as provided and that the invention is equally applicable to uncased joints.

One feature of my invention resides in a reversible brake-flange with which the universal joint may be provided. It is quite common, particularly in automobile transmission mechanism, to provide one member of the universal joint, or of one of the universal joints where there are more than one, with a flange for receiving a band or other brake. In the mechanism of some universal joints it is desirable or necessary that this flange should be over the universal joint. In other cases it is desirable or necessary that the flange should be to one side of the universal joint. To meet these varying conditions, I have devised a removable and reversible brake-flange for universal joints, consisting of a flanged disk 18, arranged to be secured to the disk member 3 of the joint, as shown. In one position of this disk its flange 19 is over the universal joint; but, if desired, the disk may be removed, turned around, and again secured in place, with the flange projecting away from the universal joint, as indicated by dotted lines in Fig. 1. In this way I am able to adapt the brake-flange for a great variety of different conditions.

Another feature of my invention resides in the cutting away of the bearing-shoulders 17 on one side to an extent sufficient to expose the bearing-bushings 9. This is done in order to permit a tool to be placed against the bearing-bushings to force the same out; otherwise it would be difficult to take down the joint when once assembled. As shown particularly in Fig. 1, the shoulders 17 are cut away on the outer side, this being the side of the bushing which is most accessible and also the side of the shoulder which would be least effective.

What I claim is—

1. In a universal joint, the combination of driving and driven members and a trunnion-block, said block provided with projecting journal-pins having bearings in said driving and driven members and also provided with bearing-shoulders coacting with integrally-formed portions of the driving and driven members, whereby transmission of load through fastenings to or from said trunnion-block is avoided.

2. In a universal joint, the combination of driving and driven members and a trunnion-block, said block having projecting journal-pins fitting within recesses of said driving and driven members, one of said members provided with bushings surrounding the journal-pins fitting within it, and having also, adjacent to said bushings, bearing-surfaces formed on integral portions of said member and coacting with corresponding bearing-surfaces formed on integral portions of said trunnion-block.

3. A one-piece trunnion-block for universal joints, comprising a single piece of metal consisting of four equidistant projecting journal-pins connected by four direct diagonal braces springing from the immediate vicinity of the bearing-surfaces of said pins.

4. A one-piece trunnion-block for universal joints, comprising a single piece of metal consisting of four projecting journal-pins connected by four diagonal braces the ends of which unite with said journal-pins to form bases for the latter, said braces springing from the immediate vicinity of the bearing-surfaces of said pins and inclosing an open central space.

5. A one-piece trunnion-block for universal joints comprising a single piece of metal consisting of four journal-pins projecting from a body formed by four diagonal braces united together at their ends and inclosing an open space.

6. A one-piece trunnion-block for universal joints comprising a single piece of metal consisting of four journal-pins projecting from a body formed by four diagonal braces, said body portion having bearing-shoulders adjacent to the bases of said pins.

7. In a universal joint, the combination of driving and driven members and a trunnion-block provided with journal-pins having bearings in said driving and driven members, one of said members having bearing-bushings surrounding the corresponding journal-pins and the trunnion-block having bearing-shoulders projecting beyond said bushings to coact with bearing-surfaces formed on said member, said shoulders cut away on one side to a diameter less than the diameter of the corresponding portions of said bearing-bushings.

In testimony whereof I have hereunto affixed my signature in the presence of two witnesses.

CLARENCE W. SPICER.

Witnesses:
M. A. St. John,
Asa F. Randolph.